Figure 1:
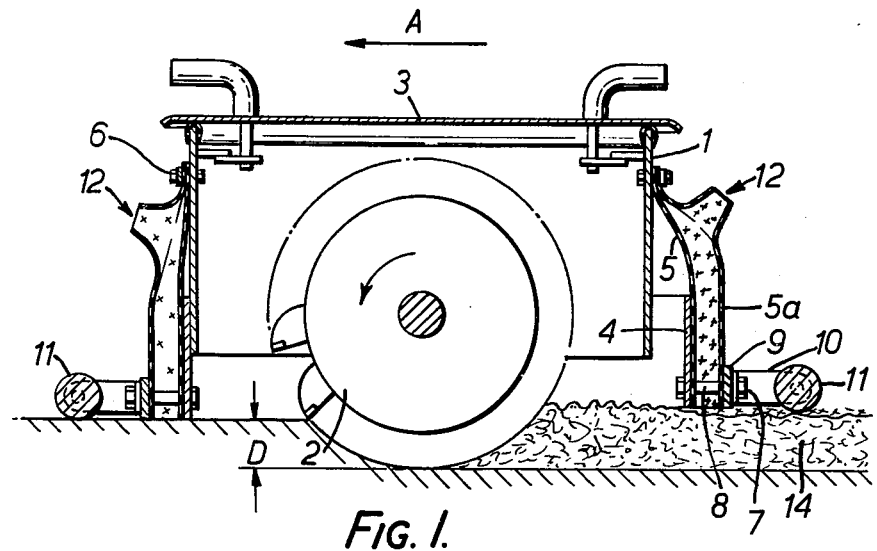

United States Patent [19]

Ely

[11] 4,191,426
[45] Mar. 4, 1980

[54] SEALING GUARD FOR A SURFACE TREATING MACHINE

[75] Inventor: Peter Ely, Ossett, England

[73] Assignee: Dresser Europe S.A., Brussels, Belgium

[21] Appl. No.: 902,504

[22] Filed: May 3, 1978

[30] Foreign Application Priority Data

May 3, 1977 [GB] United Kingdom ............. 18557/77

[51] Int. Cl.² ........................................... E01C 23/08
[52] U.S. Cl. ..................................... 299/39; 15/346
[58] Field of Search ............................... 299/39–41, 299/81, 12; 51/268, 273; 30/286, 295; 15/345, 346

[56] References Cited

U.S. PATENT DOCUMENTS

| | | | |
|---|---|---|---|
| 1,124,603 | 1/1915 | Furnas | 15/346 X |
| 2,594,116 | 4/1952 | Beyer et al. | 15/83 |
| 3,923,341 | 12/1975 | Miller | 299/39 X |
| 4,037,290 | 7/1977 | Rose et al. | 15/345 |

FOREIGN PATENT DOCUMENTS

| | | |
|---|---|---|
| 1784652 | 11/1971 | Fed. Rep. of Germany . |
| 2432971 | 3/1975 | Fed. Rep. of Germany . |
| 1555053 | 1/1969 | France . |
| 1181359 | 2/1970 | United Kingdom . |

*Primary Examiner*—Ernest R. Purser
*Attorney, Agent, or Firm*—Larson, Taylor and Hinds

[57] ABSTRACT

A guard for use with a machine in which in operation a rotary element of the machine and a surface requiring an operation to be performed thereon are relatively displaced, comprises a first guard part secured to the machine so as to leave a gap between the guard part and the surface and a second guard part mounted on the first guard part by means permitting relative movement between the guard parts and in a manner to close the gap.

To assist in the use of foam for dust suppression purposes, the mounting means for the second guard part on the first guard part defines a jacket having a fluid inlet opening and a fluid outlet opening adjacent the surface.

7 Claims, 2 Drawing Figures

U.S. Patent  Mar. 4, 1980  4,191,426

SEALING GUARD FOR A SURFACE TREATING MACHINE

This invention relates to a guard for use with a machine in which, in operation, a rotary element of the machine and a surface requiring an operation to be performed thereon are relatively displaced. An example of such a machine is a road cold planing machine employing a rotary milling cutter.

In a machine of this construction, the drum requires shielding to prevent accidental harm to the operators or on-lookers from contact with moving parts, dust and from other flying objects which may be ejected. Such shielding usually takes the form of part of the machine structure but even in normal operation of the machine and cutter it has been found not be wholly satisfactory, particularly as regards suppression of dust, even when large quantities of water are sprayed around the cutter.

According to the present invention there is provided a guard for a machine in which in operation a rotary element of the machine and a surface requiring an operation to be performed thereon are relatively displaced, comprising a first guard portion secured to the machine so as to leave a gap between the guard portion and the surface, and a second guard portion mounted on the first guard portion by means permitting relative movement between the guard portions and in a manner to close substantially the gap between the first guard portion and the surface, wherein the mounting means defines a jacket having an inlet opening and also an outlet opening to direct a fluid based substance introduced into the inlet opening onto the surface adjacent the said element.

In the case of a roadworking machine having a rotary roadworking or treating element arranged to be displaced over the road surface, the second guard portion will be controllable by the road surface.

Preferably the mounting means comprises a flexible member.

Where the element comprises a cutting drum extending transversely of the normal direction of movement of the machine and positioned to one side of the machine, the guard is preferably in the form of a hood to shroud the cutting drum and is trapezoidal when viewed in plan with the wider part of the guard at the outer end of the drum.

Figure 2:
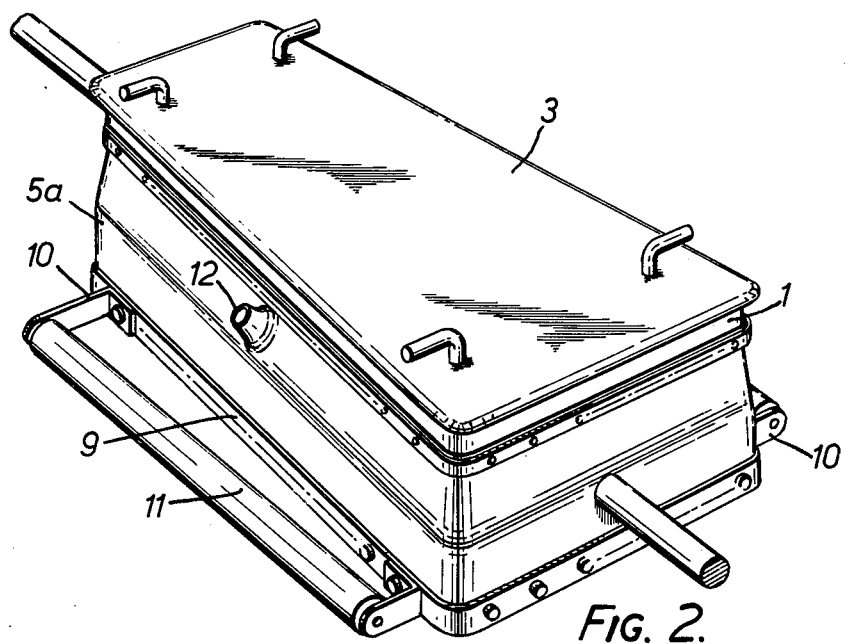

In order that the invention may be more fully understood, one embodiment thereof will now be described, by way of example, with reference to the accompanying drawings in which, FIG. 1 is a section through the cutting drum of a road cold planing machine and surrounding guard of the invention, and FIG. 2 is a perspective view of the guard.

Referring to the drawings, the guard comprises a first guard portion consisting of an inner guard member 1 which completely surrounds the cutter 2 of the road planing machine and a lid 3 which is detachably secured to the guard member 1. The guard portion 1, 3 is mounted on the machine. The guard also comprises a second guard portion in the form of an outer guard member 4 which is secured to the inner guard member 1 by an inner flexible skin 5 which permits relative movement between the guard member 4 and the guard member 1. The assembly includes an outer flexible skin 5a to form with the skin 5 a jacket surrounding the guard members 1 and 4. A multi-skin assembly may be employed, if preferred. The skins 5 and 5a are fastened to the guard member 1 at 6 as shown and the guard member 4 is bolted to the skin 5 by bolts 7 which pass through the two skins, spacers 8 to hold these skins apart and a strip 9 which encircles the skin 5a at the lower outer edge thereof. The bolts 7 also secure brackets 10 to the guard assembly which brackets carry support means shown as rollers 11 in the drawing. The support means are on opposite sides respectively of the drum as shown in FIG. 1. Whilst the guard assembly is trapezoidal in plan as shown in FIG. 2, the rollers 11 are parallel to the axis of the drum. The outer skin 5a is provided with inlets 12 for the admission into the jacket interior of an inert liquid based substance as will be described later.

The cutter 2 which is mounted to one side of the machine is adjustable in known manner for cutting depth and angular displacement relative to the horizontal, apart from being able to be lifted clear of the road surface when not in use and being traversable transversely of the machine in relation to the normal direction of machine movement (i.e. displaceable axially of the drum itself).

In normal operation, the machine is advanced in the direction A in FIG. 1 with the cutter rotating anticlockwise also as indicated and it will then plane or cut the surface to a depth D. The rollers 11 follow the contour of the surface with the leading roller in the drawing running on the unplaned or uncut road surface and the trailing roller running on the spoil 14. Due to the flexibility of the skins 5 and 5a, the guard member 4 will come into contact with the guard member 1 on the leading side and will move away from the guard member on the trailing side but on all sides, the guard member 4 and the skin assembly will substantially close the gap left between the guard member 1 and the road surface. It will be appreciated that reversal of the machine will cause the guard 4 and skin assembly to move relative to the guard 1 to the left in FIG. 1 so that a gap is left between the guard 1 and the guard 4 on the then trailing side.

The guard assembly will contain most of the dust or fumes resulting from the milling, cutting or sawing operation but to complete this suppression of dust from the machine, an inert liquid based substance is injected into the jacket via the inlets 12 to emerge through the opening between the lower edges of the skins and under the edges of the guard member 4 and strip 9 particularly on the trailing side of the drum (where there is necessarily a gap between the lower edges of the two parts 4 and 9 and the cut surface) covering any dust being discharged from this gap as indicated in the drawing. This liquid based substance may be any inert liquid, gas or solid or combination of these but it is preferred that a liquid/gas foam made from a water/air chemical solution be employed and discharged at low pressure. The provision of a jacket for this purpose ensures, where foam is employed, adequate passage for the foam but at the same time minimises the risk of the foam being broken up by the action of the drum.

The trapezoidal shape of the complete guard which is positioned with the wider part adjacent the outer end of the cutter ensures that the floating guard member 1 and strip 9 work (or tend to move) inwards of the machine. This ensures that the cutter can operate close to obstacles, such as curbs without the need for any manual adjustment.

It will be seen that the guard minimises airborne cutting dust by largely retaining it within the cover only permitting it to be discharged when covered with a layer of the liquid based substance.

I claim:

1. A guard for a machine in which in operation a rotary element of the machine and a surface requiring an operation to be performed thereon by the rotary element are relatively displaced, comprising a first guard portion encircling the rotary element and secured to the machine so as to leave a gap between the guard portion and the surface, and a second guard portion encircling the rotary element and mounted on the first guard portion by mounting means permitting relative movement between the first and second guard portions and in a manner to close substantially the gap between the first guard portion and the surface, in which the mounting means defines a jacket having an inlet opening and also an outlet opening to direct a fluid based substance introduced into the inlet opening onto the surface adjacent the said element.

2. A guard as set forth in claim 1, in which the mounting means comprises a flexible member.

3. A guard as set forth in claim 2, in which the flexible member is composed of two skins secured together and to the first guard portion at one location, the skins being spaced by spacer means at a location adjacent the surface to form the outlet.

4. A guard as set forth in claim 2, in which the first and second guard portions and the flexible member encircle the rotary element.

5. A guard as set forth in claim 4 and as fitted to a roadworking machine having a rotary roadworking or treating element arranged to be displaced over the road surface, in which the first and second guard portions and the flexible member are trapezoidal in plan with the axis of the guard lying transversely of the direction of machine displacement.

6. A guard as set forth in claim 5, in which the flexible member is provided with road engaging supporting elements.

7. A guard as set forth in claim 6, in which the supporting elements comprise rollers mouned in brackets secured to the two skins by securing means passing through the brackets, an intermediate strip, one of the skins, a spacer element, the other skin and the second guard portion.

* * * * *